United States Patent

Mao et al.

[11] Patent Number: 6,071,649
[45] Date of Patent: Jun. 6, 2000

[54] METHOD FOR MAKING A COATED ELECTRODE MATERIAL FOR AN ELECTROCHEMICAL CELL

[75] Inventors: Zhenhua Mao, Duluth; Inna Kerzhner-Haller, Auburn, both of Ga.

[73] Assignee: Motorola, Inc., Schaumburg, Ill.

[21] Appl. No.: 08/961,935

[22] Filed: Oct. 31, 1997

[51] Int. Cl.[7] .................................................. H01M 4/52
[52] U.S. Cl. ................................. 429/231.3; 429/231.1; 429/223; 423/594
[58] Field of Search ............................. 429/231.1, 231.3, 429/223; 423/594

[56] References Cited

U.S. PATENT DOCUMENTS

| Re. 33,306 | 8/1990 | Hayashi et al. | 429/194 |
|---|---|---|---|
| 5,344,726 | 9/1994 | Tanaka et al. | 429/209 |
| 5,441,832 | 8/1995 | Macklin et al. | 429/218 |
| 5,451,477 | 9/1995 | Omaru et al. | 429/218 |
| 5,529,859 | 6/1996 | Shu et al. | 429/194 |
| 5,543,021 | 8/1996 | Yazami et al. | 204/294 |
| 5,589,289 | 12/1996 | Zhang et al. | 429/122 |
| 5,677,083 | 10/1997 | Tomiyama | 429/194 |

FOREIGN PATENT DOCUMENTS

| 7-235292 | 9/1995 | Japan | H01M 4/02 |
|---|---|---|---|
| 8-236114 | 9/1996 | Japan . | |
| 9-035715 | 2/1997 | Japan | H01M 4/58 |
| 9-055210 | 2/1997 | Japan | H01M 4/58 |
| 9-330720 | 12/1997 | Japan . | |
| 10-092429 | 4/1998 | Japan . | |
| 10-236836 | 9/1998 | Japan . | |

*Primary Examiner*—Maria Nuzzolillo
*Assistant Examiner*—Carol Chaney
*Attorney, Agent, or Firm*—Felipe J. Farley; Philip H. Burrus, IV

[57] ABSTRACT

A method for making a coated electrode material for a lithium rechargeable electrochemical cell (10) includes the steps of mixing (65) Co and Li salts, then either dissolving (70) the Li and Co salts in water to form a solution or heating (70) the salts to form a melt. A lithium nickel oxide material is mixed (80) with the solution or the melt to form a mixture, and the mixture is dried (85) to result in $LiCoO_2$-coated $LiNiO_2$. Increased performance can be achieved by including a post-treatment step in which the $LiCoO_2$-coated $LiNiO_2$ is heated (90) to about 700° C.

6 Claims, 5 Drawing Sheets

METHOD FOR MAKING A COATED ELECTRODE MATERIAL FOR AN ELECTROCHEMICAL CELL

CROSS REFERENCE TO RELATED APPLICATIONS

This application is related to attorney's Docket No. EN10626 by Mao et al., entitled "Coated Electrode Material for an Electrochemical Cell" and filed on the filing date hereof.

1. Technical Field

This invention relates in general to secondary rechargeable electrochemical cells, and more particularly to methods for making high capacity positive electrodes for use in lithium rechargeable cells.

2. Background of the Invention

Secondary lithium electrochemical cells, and particularly lithium batteries using an intercalation compound as the positive electrode or cathode of the battery, have been studied intensely during the past decade. Heretofore, the cathode material used in these batteries was typically a lithiated cobalt oxide, nickel oxide, or manganese oxide. Lithiated transition metal oxide batteries are being studied as an alternative to current nickel-cadmium and nickel-metal hydride cells because they possess several attractive characteristics, e.g., high cell voltage, long shelf life, a wide operating temperature range, and use of relatively non-toxic materials. The earliest reports of lithiated nickel oxide and lithiated cobalt oxide materials as positive electrode materials in rechargeable lithium batteries occurred more than a decade ago and is shown in, for example, U.S. Pat. Nos. 4,302,518 and 4,357,215, both to Goodenough et al. These materials have been intensively investigated. One of them, lithium cobalt oxide, is currently used in commercial lithium ion batteries.

Charge and discharge of the materials fabricated according to these processes proceeds by a charge mechanism of deintercalation and intercalation of lithium ions from and into these materials. The materials synthesized by the prior art methods have a reversible capacity on the order of approximately 135 milliamperes per gram (mAh/g). In other words, about 0.5 lithium ions can be reversibly deintercalated and intercalated from and into each mole of lithiated nickel oxide or lithiated cobalt oxide.

The performance of lithiated nickel oxide electroactive material deteriorates rapidly when exposed to moisture or water. Additionally, the capacity of such a material fades quickly if the material is charged and discharged within a wide potential window, such as when it is cycled between 2.5 and 4.3 volts versus lithium.

Accordingly, there exists a need to develop a new cathode material that demonstrates performance characteristics superior to those of the prior art materials. Such materials should have higher capacity, greater stability, and minimal sensitivity to moisture.

DETAILED DESCRIPTION OF THE PREFERRED EMBODIMENT

Figure 1:
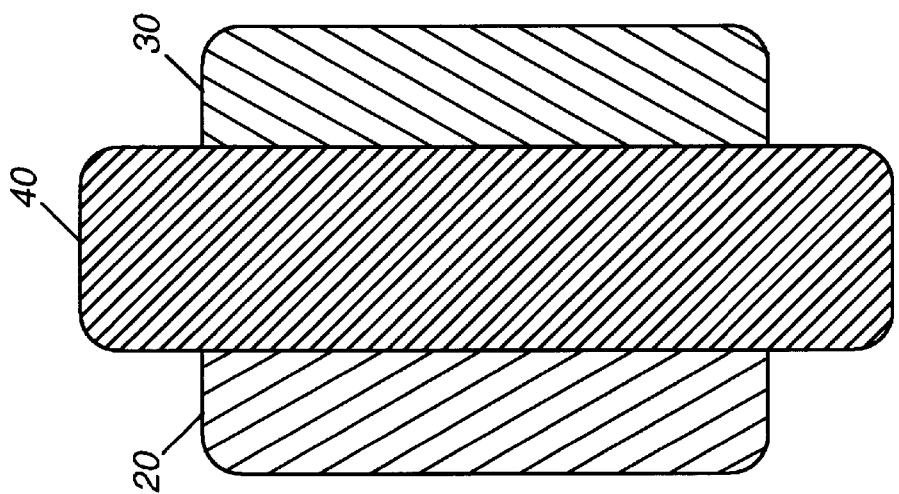
FIG. 1 is a schematic representation of an electrochemical cell including an electrode in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell 10 including a lithiated transition metal oxide electrode in accordance with the instant invention. The electrochemical cell includes a positive electrode 20 and a negative electrode 30 and has an electrolyte system 40 disposed therebetween. The electrochemical cell 10 further includes a positive electrode fabricated of a transition metal oxide which is described in greater detail hereinbelow.

The negative electrode 30, or anode, of the cell 10 may be fabricated from a material selected from the group consisting of, but not limited to, lithium metal, lithium alloying metals, such as aluminum, tin, and bismuth, carbon (including graphite and petroleum coke), low voltage lithium intercalation compounds such as $TiS_2$, $V_6O_{13}$, $MoS_2$, and combinations thereof. Alternatively, the negative electrode 30 may be fabricated of the pyrolysis reaction product of multifunctional organic monomers, such as is disclosed in U.S. Pat. No. 5,589,289 to Zhang et al., issued Dec. 31, 1996 and U.S. Pat. No. 5,609,844 to Zhang et al., issued Mar. 11, 1997, the teachings of which are hereby incorporated by reference.

The electrolyte 40 can be either a solid, a gel, or a liquid electrolyte system. Further, the electrolyte 40 can be either an aqueous or non-aqueous electrolyte system. The electrolyte 40 may also act as a separator between a positive and negative electrodes. In one preferred embodiment, the electrolyte is fabricated of a material such as is disclosed in commonly assigned U.S. Pat. No. 5,639,573 to Oliver et al., issued Jun. 17, 1997, the teachings of which are hereby incorporated by reference.

In accordance with the instant invention, there is provided a method for fabricating a lithiated transition metal oxide material which is capable of storing and discharging electrical charge. The material disclosed herein is therefore useful as the cathode in lithium rechargeable batteries. The stabilized material includes a first lithiated transition metal oxide material having the formula $Li_xTM_yO_2$, where TM is preferably nickel or a nickel alloy; $0.98 \leq x \leq 1.1$; and $0.98 \leq y \leq 1.1$. According to the present invention, the material is coated with a second lithiated transition metal oxide material, preferably $LiCoO_2$ or $LiCo_xNi_{1-x}O_2$, where x is between 0.98 and 1.1. In one preferred embodiment, the electrode material is $LiNiO_2$ coated with $LiCoO_2$.

As mentioned briefly in the Background of the Invention above, pure $LiNiO_2$ is very sensitive to moisture, exposure to which can cause rapid deterioration and formation of impurities, and the capacity of pure $LiNiO_2$ fades if the material is charged and discharged within a wide potential window. It is hypothesized that this problem is a result of exposure to moisture and the resulting surface state of the material particles.

During charge/discharge cycling, an inactive layer can develop on the surface of LiNiO$_2$ particles, causing an increase in surface resistance and a decrease in the capacity of the material. If the surfaces of the LiNiO$_2$ particles are modified by coating with another material, the particles become less moisture sensitive and more stable with respect to capacity. Coating the LiNiO$_2$ particles with lithium cobalt oxide or cobalt-doped lithium nickel oxide is preferred since cobalt is less sensitive to moisture than is nickel and since cobalt has a high charge efficiency and stable capacity. LiNiO$_2$ coated with LiCoO$_2$ or LiCo$_x$Ni$_{1-x}$O$_2$ according to the present invention therefore results in an electroactive material that has both stable high capacity and high initial charge efficiency.

Figure 2:
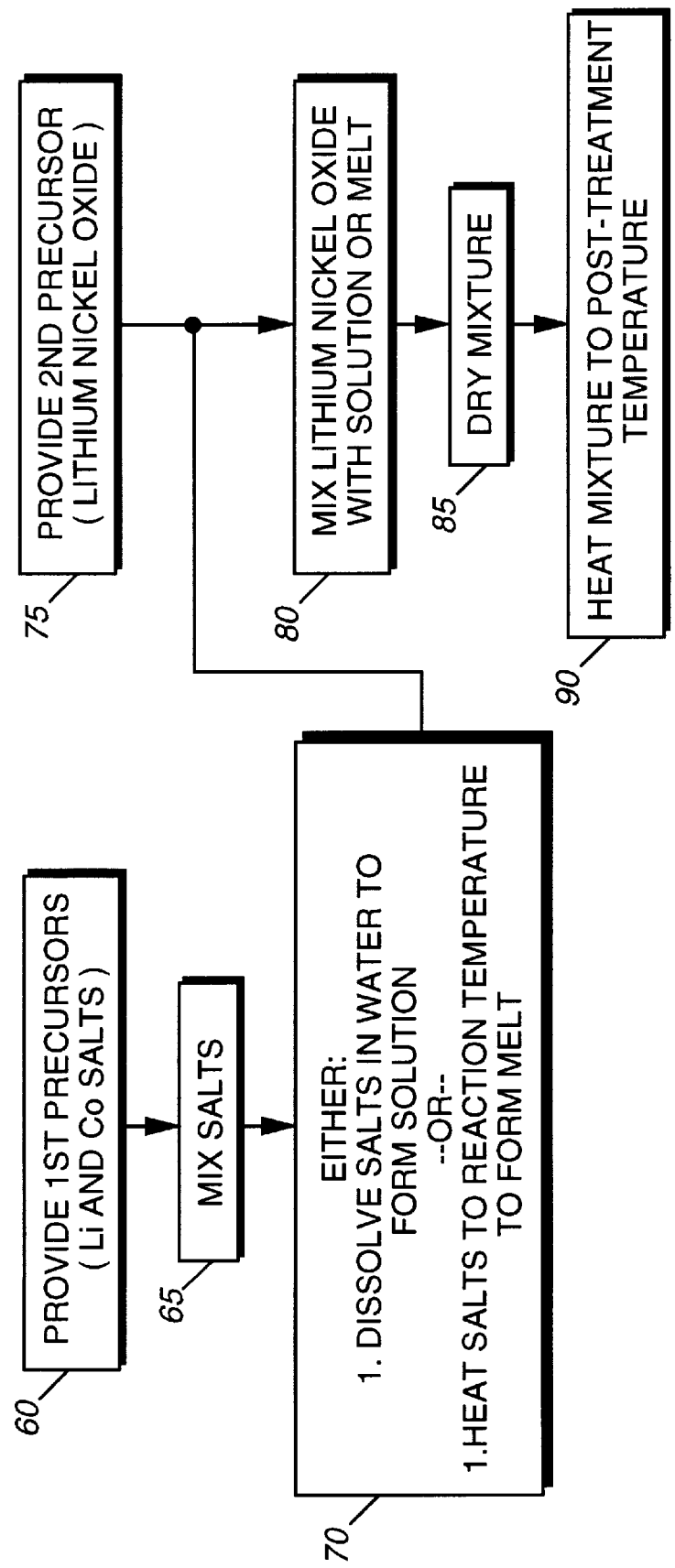
FIG. 2 is a flowchart illustrating a method for making $LiCoO_2$-coated $LiNiO_2$ formed in accordance with the present invention.

Referring next to FIG. 2, a method for coating a transition metal oxide layer onto a LiNiO$_2$ particle surface is illustrated. The starting materials are preferably a LiNiO$_2$ powder, provided at step 75, and a solution or a melt that contains Li and Co salts, provided at step 60. The precursor LiNiO$_2$ material can comprise any of known LiNiO$_2$ materials. For instance, the LiNiO$_2$ can be any of the materials described in U.S. Pat. No. 5,591,548 to Mao et al., issued Jan. 7, 1997, the teachings of which are hereby incorporated by reference.

The precursor salts, as mentioned, include Co and Li salts. Cobalt salts that are suitable for use include cobalt nitrate (Co(NO$_3$)$_2$6H$_2$O), cobalt carbonate (COCO$_3$), cobalt sulfate (CoSO$_4$), and cobalt chloride (CoCl$_2$), among others. Lithium salts that can be used to form the coated LiNiO$_2$ include, but are not limited to, lithium hydroxide (LiOH), lithium nitrate (LiNO$_3$), and lithium carbonate (LiCO$_3$). A lithium salt and a cobalt salt are mixed, at step 65, in molar ratio of 1 to 1, and then are either dissolved in water to form a solution or heated to a reaction temperature to form a melt, at step 70. The LiNiO$_2$ is mixed, at step 80, with the solution or the melt, and the resulting mixture is dried, at step 85, and reacted to form LiNiO$_2$ particles having a coated layer of LiCoO$_2$ or LiCo$_x$Ni$_{1-x}$O$_2$. The coated particles can then be heated, at step 90, to provide performance advantages that are described below.

EXAMPLES

The cobalt and lithium salts of cobalt nitrate and lithium nitrate were selected for use since both salts dissolve easily in water and decompose completely when heated at an elevated temperature, such as a reaction temperature of greater than about 620° C. LiCoO$_2$ can be formed by the following reaction:

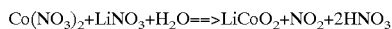

Co(NO$_3$)$_2$+LiNO$_3$+H$_2$O==>LiCoO$_2$+NO$_2$+2HNO$_3$ where both the NO$_2$ and the HNO$_3$ are in vapor form.

Desired amounts of LiNO$_3$ and Co(NO$_3$)$_2$6H$_2$O were dissolved in water to make different solutions. The solutions were separately mixed with different amounts of LiNiO$_2$ powder having particle sizes of less than about 38 μm to form different mixtures. The mixtures were dried at an elevated temperature of greater than about 100° C., heated at about 615° C. in Ar for approximately 20 hours, then heated again at about 650° C. for approximately 10 hours. A total of five samples were made in this way for different amounts of LiCoO$_2$. The different amounts of LiCoO$_2$ were 2, 4, 8, 10, and 15 wt %. Some of the samples were heated further at about 700° C. and about 750° C. in air to study the effects of temperature on the performance of the materials. An additional two samples were made with 10 and 15 wt % LiCoO$_2$ without heating at 650° C. These two samples were heated in air at 750° C. for 6 hours, 800° C. for 3 hours, 850° C. for 2 hours, and 900° C. for 2 hours.

The materials were characterized by using X-ray diffraction (XRD) to determine the structural changes, and T-cells were used to measure the capacity as well as charge efficiency of the materials by charging and discharging the T-cells at a constant current within 3 to 4.3 volts.

Figure 3:
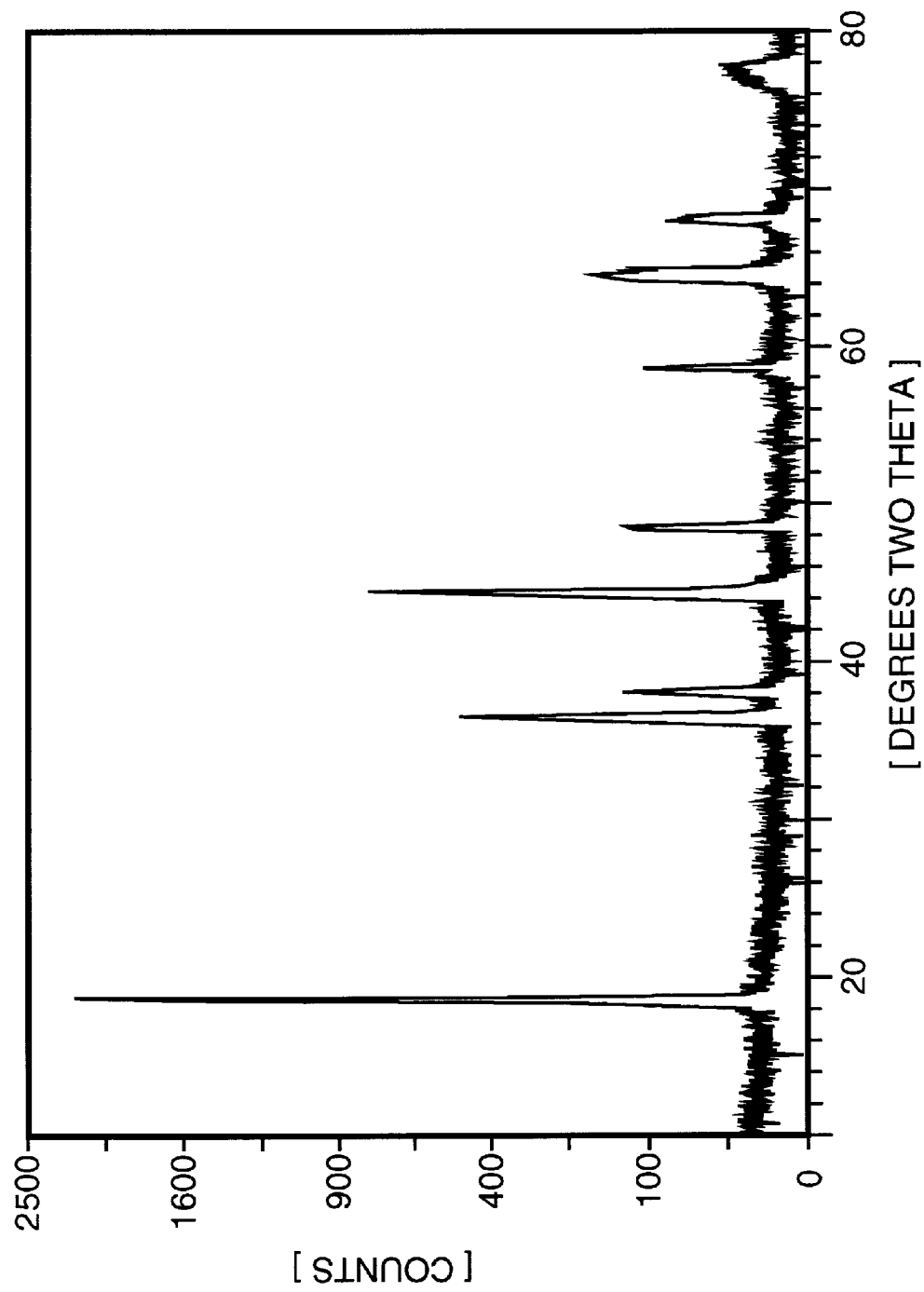
FIG. 3 is a diagram of an X-ray diffraction pattern for $LiCoO_2$-coated $LiNiO_2$ formed in accordance with the present invention.

The XRD patterns of the LiCoO$_2$-coated LiNiO$_2$ are somewhat similar to that of pure LiNiO$_2$, although differences in the intensity peak ratios were noted. The typical peak ratio of I$_{003}$/I$_{104}$ (the ratio of the peak near 44.4 degrees to the peak near 18.8 degrees) decreases as, the LiCoO$_2$ content is increased. An XRD pattern of LiCoO$_2$-coated LiNiO$_2$ is shown in FIG. 3.

The initial capacities and charge efficiencies of the LiCoO$_2$-coated LiNiO$_2$ are summarized in Tables I and II for the two post-treatment temperatures of 650° C. and 700° C., respectively. The experiments were terminated before 5 cycles for 2, 4, 8, and 10 wt % LiCoO$_2$-coated materials because of unusual cell behavior.

TABLE 1

Effect of LiCoO$_2$-coating level on the capacity and charge efficiency (post-treated at 650° C. in air)

| LiCoO$_2$ (%) | 0 | 2 | 4 | 8 | 10 | 15 |
|---|---|---|---|---|---|---|
| C (mAh/g) | 233.1 | 217.5 | 230.1 | 220.2 | 213.2 | 211.4 |
| E.F. (%) | 90.6 | 85.7 | 88.8 | 91.5 | 90.6 | 92.6 |
| C at 5th cycle (mAh/g) | 213.3 | | | | | 206.5 |
| C$_5$/C$_1$ (%)* | 91.5 | | | | | 97.7 |

TABLE 2

Effect of LiCoO$_2$-coating level on the capacity and charge efficiency (post-treated at 700° C. in air)

| LiCoO$_2$ (%) | 0 | 2 | 4 | 8 | 10 | 15 |
|---|---|---|---|---|---|---|
| C (mAh/g) | 233.1 | 216.9 | 222.8 | 223.8 | 187 | 210.9 |
| E.F. (%) | 90.6 | 88.6 | 90.3 | 92.8 | 75.4 | 94.2 |
| C at 5th cycle (mAh/g) | 213.3 | 101.5 | 176.3 | 209.5 | | 207 |
| C$_5$/C$_1$ (%)* | 91.5 | 46.8 | 79.1 | 93.6 | | 98.1 |

As shown, as the amount of LiCoO$_2$ is increased, the charge efficiencies increased for both temperatures, and the initial capacities decreased. This was expected because of the low capacity of LiCoO$_2$. The materials treated at 700° C. had higher charge efficiencies than those treated at 650° C.

Figure 4:
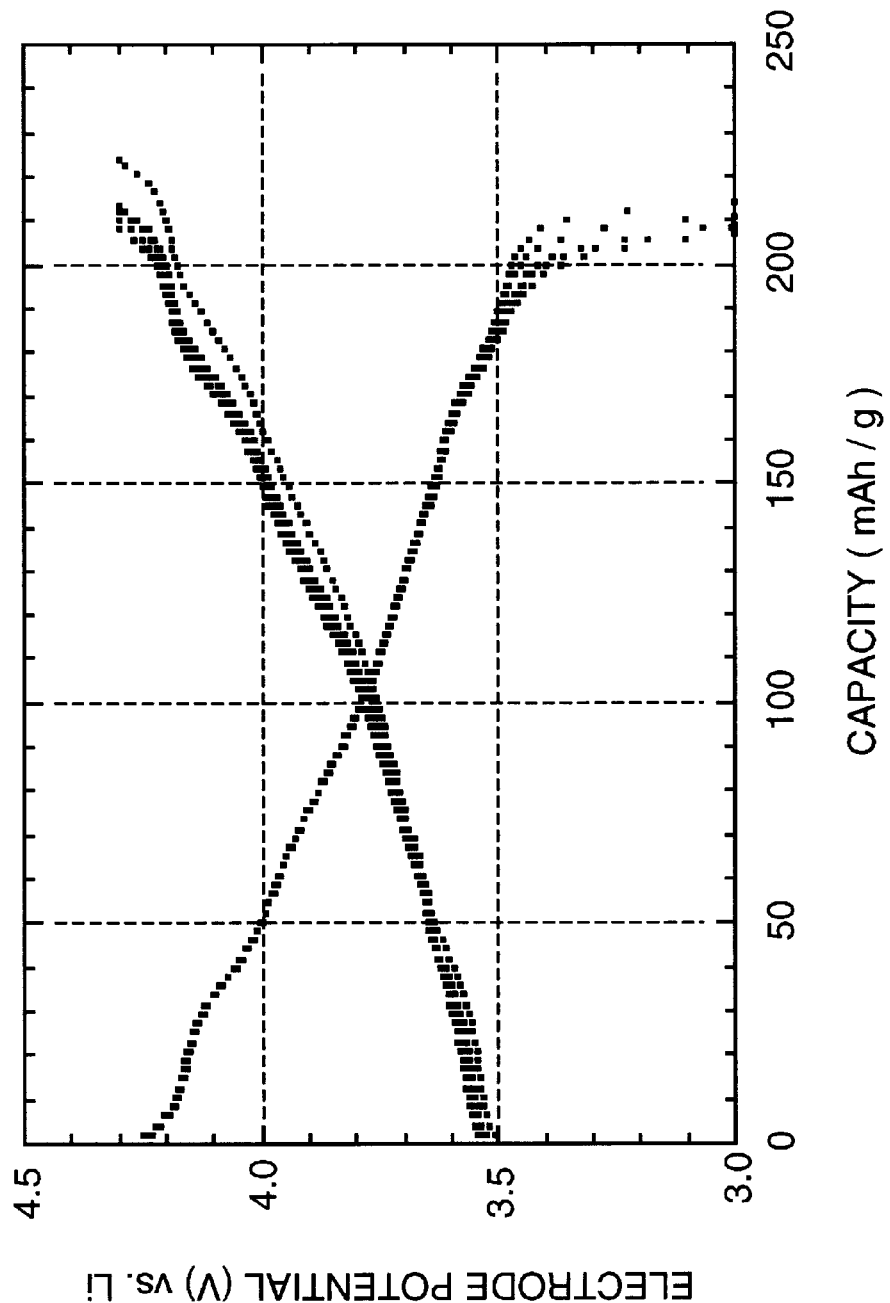
FIG. 4 is a diagram of charge and discharge curves for the cathode material of the present invention at room temperature.

Compared to pure LiNiO$_2$, the LiCoO$_2$-coated LiNiO$_2$ materials at 15 wt % and 8 wt %, which were heated to 700° C., had better cycle abilities, although the initial capacities of these materials were less than 10% lower than pure LiNiO$_2$. FIG. 4 shows the charge and discharge potential profiles of the 15 wt % LiCoO$_2$-coated LiNiO$_2$ that was post-treated at 700° C. It can be seen that the potential profiles are nearly overlapped between the cycles, illustrating that the material is highly stable during cycling. More significantly, the potential plateau near 4.2 volts remains nearly the same during cycling, whereas it rapidly decreases for pare LiNiO$_2$ because of interaction between the electrode material and the electrolyte. Therefore, it is hypothesized that the high stability of the LiCoO$_2$-coated LiNiO$_2$ is attributable to the surface protection provided by the LiCoO$_2$.

Although a high temperature treatment may increase the charge efficiency of LiCoO$_2$, the crystalline structure of $LiNiO_2$ can be destroyed by the high temperature. The optimum temperature for treatment should be below the optimum temperature for $LiCoO_2$, but above the optimum temperature for $LiNiO_2$. The above data clearly indicate that 700° C. is better than 650° C. Post-treatment at higher temperature was therefore investigated. Table 3 summarizes initial capacity and charge efficiency.

TABLE 3

The effect of post-treatment temperature on initial capacity and charge efficiency

| wt % $LiCoO_2$ | 650° C. | 700° C. | 750° C. | 800° C. | 850° C. | 900° C. |
|---|---|---|---|---|---|---|
| 2 | 217 mAh/g 85.7% | 217 mAh/g 88.6% | 202 mAh/g 84.8% | | | |
| 4 | 230 mAh/g 88.8% | 223 mAh/g 90.3% | 207 mAh/g 86.6% | | | |
| 8 | 220 mAh/g 91.5% | 224 mAh/g 92.8% | 213 mAh/g 89.4% | | | |
| 10 | 213 mAh/g 90.6% | 187 mAh/g 75.4% | 215 mAh/g 90.0% | 196 mAh/g 86.6% | 146 mAh/g 70.1% | |
| 15 | 211 mAh/g 92.6% | 211 mAh/g 94.2% | 212 mAh/g 92.5% | 200 mAh/g 89.1% | 182 mAh/g 85.3% | 163 mAh/g 80.8% |

Except for 10 wt % $LiCoO_2$-coated material, the charge efficiency increased and reached a maximum at 700° C. and then decreased as the post-treatment temperature was increased.

Figure 5:
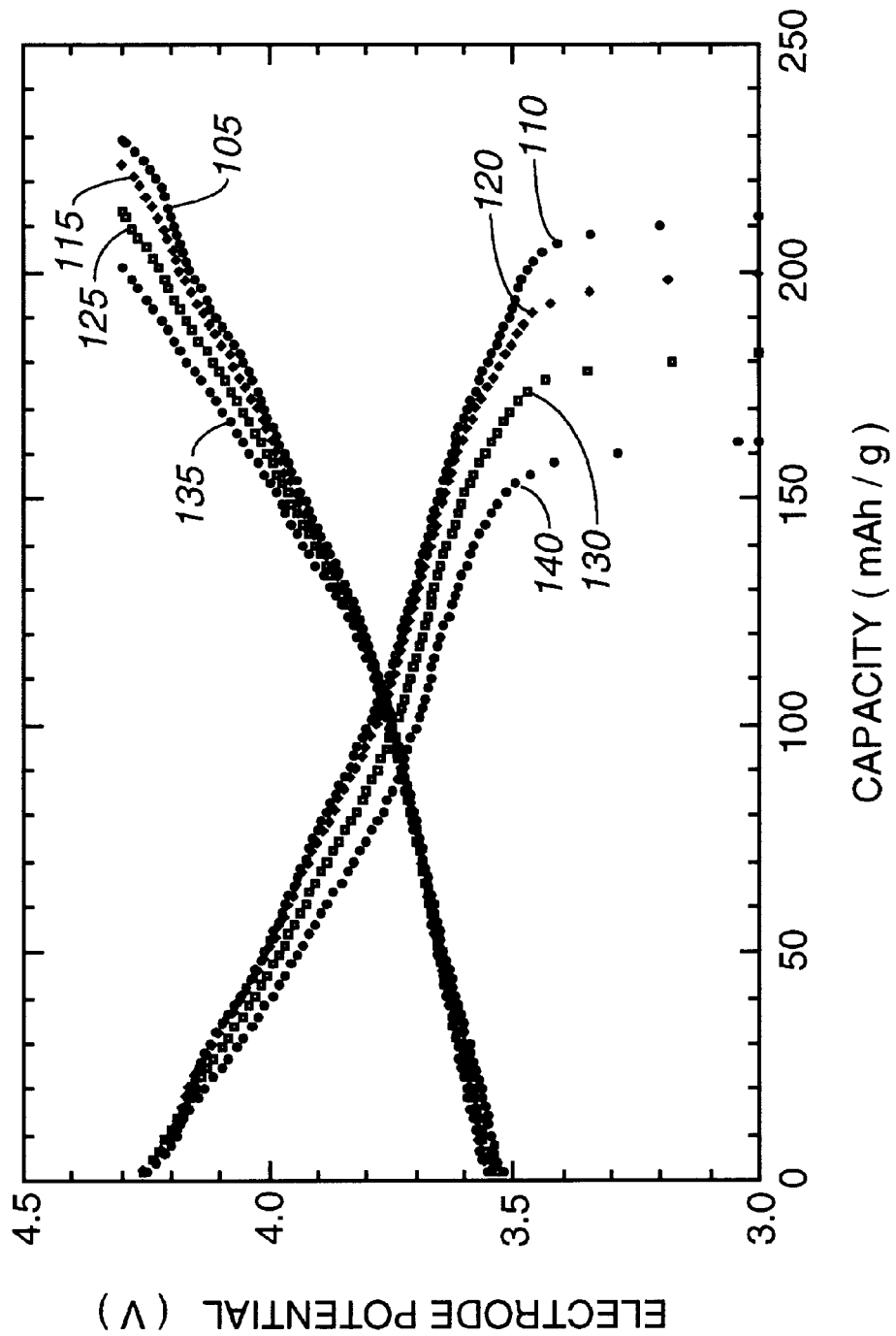
FIG. 5 is a diagram of charge and discharge curves for the cathode material of the present invention at various temperatures.

FIG. 5 shows the charge and discharge electrode potential profiles for the 10 wt % $LiCoO_2$-coated materials that were treated at different temperatures. Curves 105 and 110 represent charge and discharge profiles at 750° C., curves 115 and 120 represent profiles at 800° C., curves 125 and 130 represent profiles at 850° C., and curves 135 and 140 represent profiles at 900° C. As the post-treatment temperature was increased, the potential plateau near 4.2 volts gradually diminished, and the irreversible capacity loss increased. Generally, the cycle ability of a cathode material for a rechargeable Li-ion cell strongly depends on the initial charge efficiency. More specifically, a higher charge efficiency is equated with better cycling ability of the material. Therefore, it is expected that the $LiCoO_2$-coated $LiNiO_2$ can be advantageously and successfully used as a high capacity cathode material in rechargeable Li-ion cells.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for making an electrode material for a lithium rechargeable electrochemical cell the method coring the steps of:

providing a first lithiated transition metal oxide material; and coating particles of the first lithiated transition metal oxide material with a second lithiated transition metal oxide material, wherein the first lithiated transition metal oxide material comprises lithium nickel oxide, wherein the second lithiated transition metal oxide material comprises cobalt-doped lithium nickel oxide.

2. A method for making an electrode material for a lithium rechargeable electrochemical cell, the method comprising the steps of:

providing a first lithiated transition metal oxide, material; and coating particles of the first lithiated transition metal oxide material with a second lithiated transition metal oxide material, wherein the first lithiated transition metal oxide material comprises lithium nickel oxide, wherein the method comprises, prior to the coating step, the steps of:

providing Li and Co salts;

mixing the Li and Co salts; and heating the Li and Co salts to a reaction temperature to form a melt.

3. The method of claim 2, wherein the reaction temperature is greater than approximately 620° C.

4. The method of claim 2, wherein the coating step comprises the steps of:

mixing the lithium nickel oxide with the metal to form a mixture; and drying the mixture to result in coated electrode material.

5. A method for making an electrode material for a lithium rechargeable electrochemical cell, the method comprising the steps of:

providing a precursor comprising lithium nickel oxide; and coating particles of the lithium nickel oxide with $LiCoO_2$;

wherein the method comprises, prior to the coating step, the steps of:

providing Li and Co salts;

mixing the Li and Co salts; and heating the Li and Co salts to a reaction temperature to form a melt;

mixing the lithium nickel oxide with the melt to form a mixture; and drying the mixture to result in coated electrode material.

6. A method for making an electrode material for a lithium rechargeable electrochemical cell, the method comprising the steps of:

providing a precursor comprising lithium nickel oxide;

providing Li and Co salts;

mixing the Li and Co salts;

dissolving the Li and Co salts in water to form a solution;

mixing the lithium nickel oxide with the solution to form a mixture; and drying the mixture to result in lithium nickel oxide having particles coated with $LiCoO_2$.

* * * * *